Jan. 15, 1952         C. L. PETERSON ET AL         2,582,273
                            FILTER
Filed Nov. 22, 1946                         4 Sheets-Sheet 1
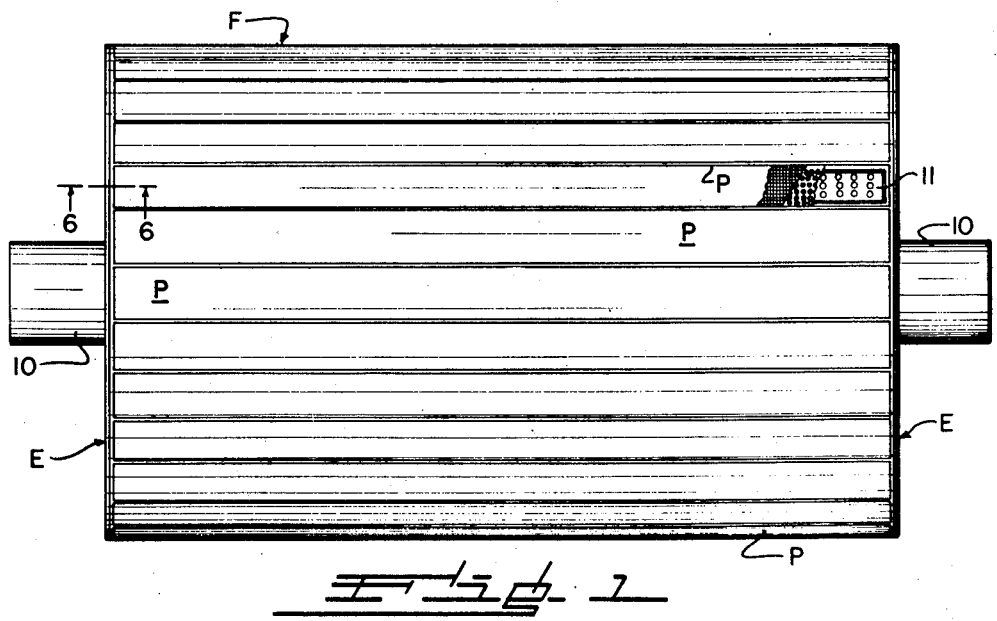
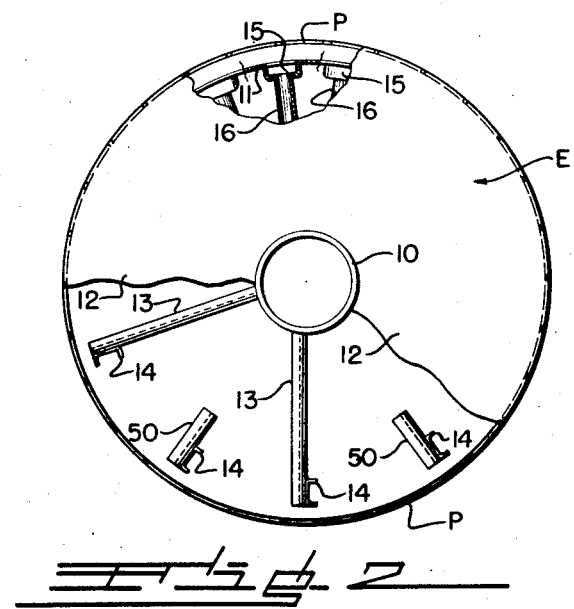
INVENTORS.
C. Lynn Peterson
Eugene Kroff
Clarence J. Peterson
By
         ATTORNEY Jan. 15, 1952  C. L. PETERSON ET AL  2,582,273
FILTER
Filed Nov. 22, 1946  4 Sheets-Sheet 2
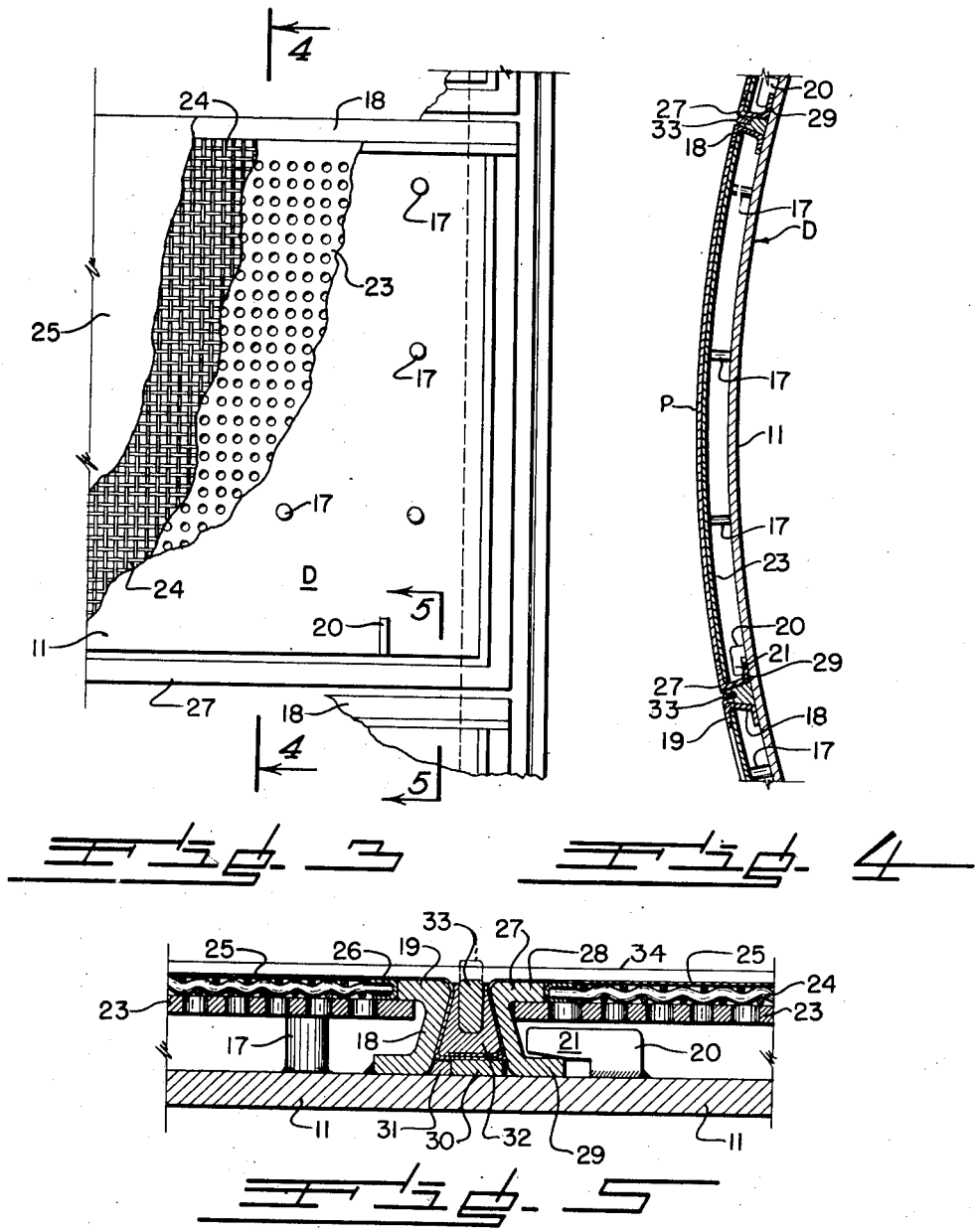
INVENTORS
C. Lynn Peterson
Eugene Kroff
Clarence J. Peterson
By
ATTORNEY

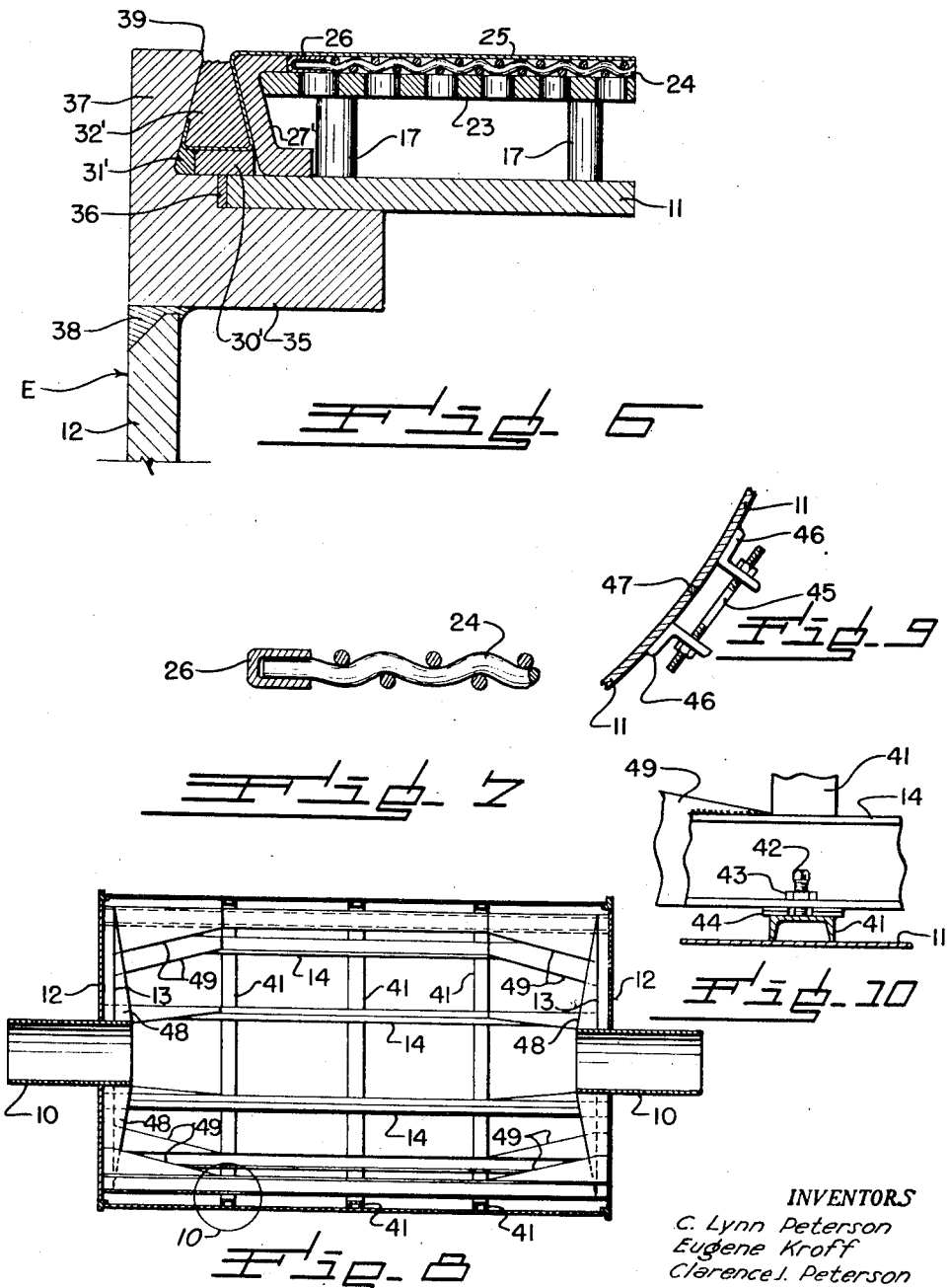

Jan. 15, 1952     C. L. PETERSON ET AL     2,582,273
FILTER
Filed Nov. 22, 1946                                  4 Sheets-Sheet 4
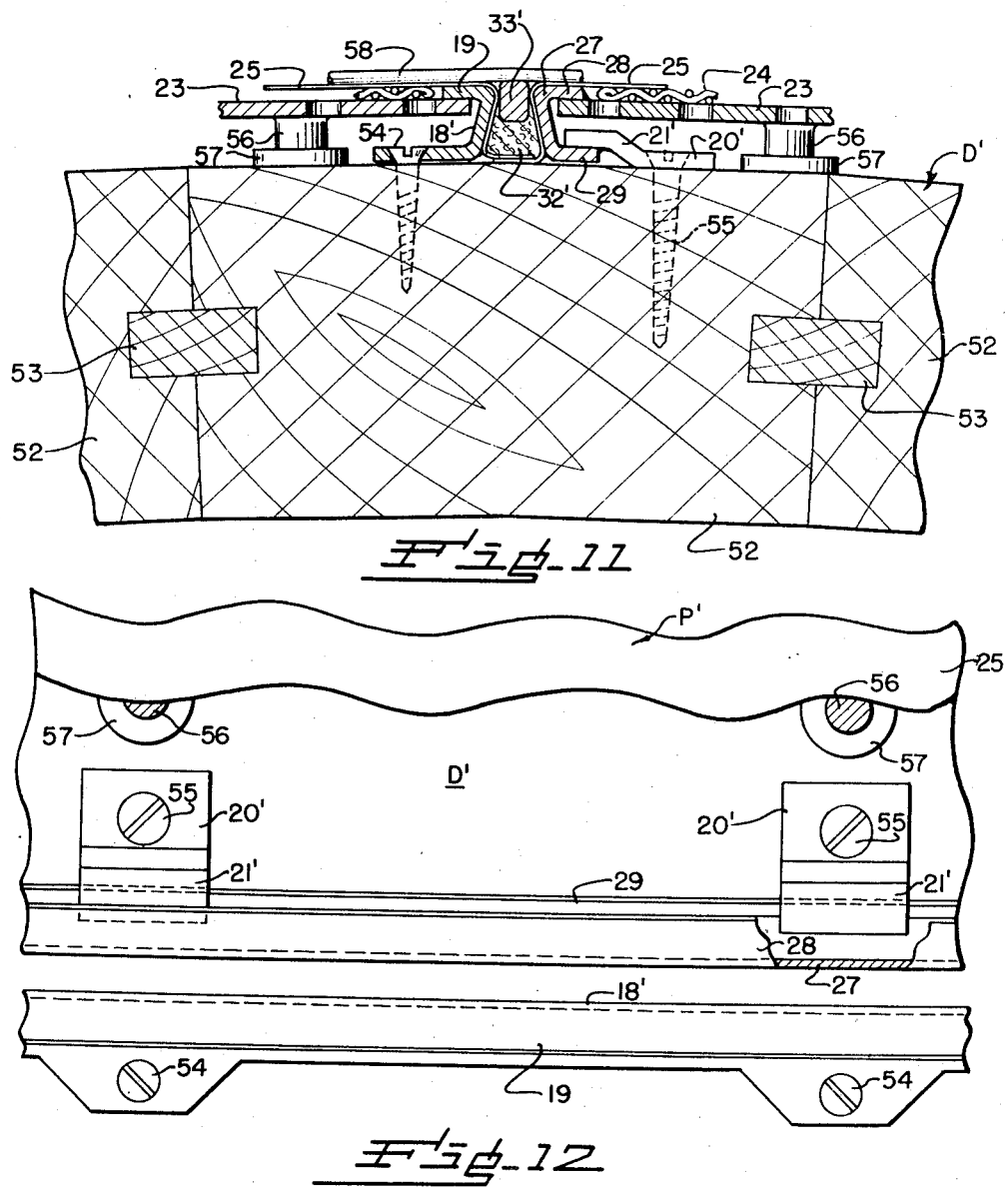
INVENTORS
C. Lynn Peterson
Eugene Kroff
Clarence J. Peterson
By
ATTORNEY Patented Jan. 15, 1952

2,582,273

UNITED STATES PATENT OFFICE 2,582,273

FILTER

C. Lynn Peterson, Eugene Kroff, and Clarence J. Peterson, Salt Lake City, Utah, assignors, by mesne assignments, to General American Transportation Corporation, a corporation of New York Application November 22, 1946, Serial No. 711,726

8 Claims. (Cl. 210—202)

This invention relates to filters and filter panels, and more particularly to a drum type filter and a special panel therefor.

Drum type filters are normally cylindrical in shape, and are provided about the outer cylindrical surface with a filter cloth or other filter medium. The drum is rotated, as about a horizontal axis, so that successive portions of the filter medium will pass through the material to be filtered, usually divided solids carried by a liquid. Such filters are commonly divided into radial sections, so that as the drum rotates, a vacuum effect can be produced in the interior of each section as it passes through the material, the liquid thus being drawn through the filter medium and the solid particles caused to deposit upon the exterior surface of the filter medium or within the same. The removed liquid is drawn to discharge or to a point of further treatment by pumps or the like producing the vacuum effects within the sections. As the drum continues to rotate, each section in turn emerges from the material, and the vacuum effect is preferably continued while a washing liquid or the like is sprayed onto the deposited solids, to displace the liquid remaining therein. Afterward, a pressure effect, such as obtained by blowing compressed air through the section, may be utilized to effect discharge of the cake of deposited solid particles. Also, a scraper extending across the drum, as on the back side thereof, may be utilized to remove the cake, the scraper being used either alone or in conjunction with the pressure effect. The material to be recovered is sometimes the liquid, sometimes the solid carried by the liquid, and sometimes both. However, the effect desired is a separation of the solid particles and liquid.

In conventional constructions of such filters, a filter cloth extends around the cylindrical periphery of the drum, and is held on the drum by a series of circumferentially extending wires, bands or the like. The cloth may be supported by bars, spaced plates, or the like, and the drum may be divided into sections by radial partitions. Connections to the radial sections are conventionally provided at the end of the filter, and valve means for transmitting the vacuum and pressure effects are also provided at the end of the drum. However, there are may disadvantages in such construction, particularly in connection with the filter cloth. Thus, if one portion of the cloth becomes worn, it is necessary either to patch the cloth while on the filter or remove the cloth and substitute a new cloth. In addition, the circumferential bands or straps tend to become dislodged by the scraper, and also prevent all of the cake from being removed by the scraper. A coating of cake or residue may thereby be left on the cloth, even after the scraper has passed over the same, and this residue decreases the effectiveness of pickup when the vacuum is again produced as each filter section again enters the material to be filtered.

Among the objects of this invention are to provide a novel filter construction and also a novel filter panel; to provide such a filter wherein the peripheral contour of the filter medium is unform; to provide such a construction in which such uniform contour of the filter medium is assured at a minimum of construction cost; to provide such a filter in which the filter medium is divided into sections; to provide a panel for a filter medium section which is readily removable, to permit ready replacement of a worn or damaged filter medium section; to provide such a filter in which the filter medium or cloth is firmly held in position by means normally disposed below the level of the filtering surface, so that a scraper, for instance, can be adjusted to remove a maximum of cake; to provide a filter panel which may be replaced readily without danger of sparks or the like, which tend to cause explosions; to provide a filter panel of the foregoing character which may be removed or replaced with ease, yet which permits the filter medium therefor to be removed and replaced with a minimum of disturbance of adjacent panels; to provide such a panel which is provided with locking means particularly adapted to cooperate with a filter of the above character, for securing each panel to the periphery of the filter drum; to provide an alternative filter construction which may be made in part of wood; and to provide a filter construction and filter panel which is relatively simple in construction yet highly effective in operation. Other objects and the novel features of this invention will become apparent from the description which follows.

In general, one embodiment of a filter constructed in accordance with this invention comprises a cylindrical metal deck divided into sections by longitudinally extending bars or channels, which also serve for attachment of the panels carrying the filter medium. The deck is provided with a plurality of extending studs or projections which may conveniently be welded thereto. The studs or projections may be machined or ground to a uniform height, thus avoiding the necessity of machining the surface of the deck to uniform dimensions. The filter panel for such embodiments may comprise a perforated plate adapted to rest on the machined ends of the extending studs or projections, a wire screen or the like being attached to the outside of the plate, as by welding.

In another embodiment of this invention, the deck is formed of wood and is divided into sections by longitudinally extending channels attached, as by wood screws, to the deck. The filter panels include a perforated plate and screen attached thereto, but the extending studs are attached to the plate, as by welding, and space the plate at an accurate predetermined distance from the deck.

In both embodiments, the filter medium, such as a filter cloth, is supported by the panel screens, and extends into grooves or channels formed along the sides and also along each end of each panel. These grooves or channels are preferably wedge-shaped and wider at the bottom, so that a compressible caulking material may be forced into the grooves and thereby hold the filter medium securely, as well as maintain the panels in position on the drum. The co-operating attaching means on the drum and the panels may be constructed in a number of different ways, as will appear hereinafter.

Filters embodying the above and additional features of this invention are illustrated in the accompanying drawings, in which:

Fig. 1 is a front elevation of a filter drum embodying this invention, partly broken away more clearly to show the construction of the panels;

Fig. 2 is an end view of the drum, also partly broken away;

Fig. 3 is an enlarged plan view of a portion of a panel and the deck beneath, the panel being partly broken away more clearly to show the construction;

Fig. 4 is a circumferential section taken along line 4—4 of Fig. 3;

Fig. 5 is a further enlarged circumferential section taken along line 5—5 of Fig. 3, at the junction between two panels;

Fig. 6 is a further enlarged, partial longitudinal, sectional view, the section being taken along line 6—6 of Fig. 1;

Fig. 7 is a still further enlarged partial longitudinal section of the screen forming a portion of a filter panel;

Fig. 8 is a reduced longitudinal section illustrating the framework of the drum;

Fig. 9 is an enlarged fragmentary section illustrating one form of means for pulling up the wrapping or deck plate on which the studs are mounted;

Fig. 10 is an enlarged fragmentary section of the indicated portion of Fig. 8;

Fig. 11 is a fragmentary transverse section of a portion of a filter drum also constructed in accordance with this invention, having a wooden deck on which the panels are mounted;

Fig. 12 is a plan view of a portion of the periphery of the drum of Fig. 11, certain parts being broken away to illustrate the construction more clearly.

As illustrated in Figs. 1 and 2, the principles of this invention may be applied to a drum type filter F which includes a plurality of removable panels P, each adapted to provide a longitudinal filtering section. The panels P are installed about the cylindrical periphery of the drum, being mounted on a deck D, and extend between end discs E which in turn include trunnions 10, the latter being supported in suitable bearings and conventional means provided for rotating the drum. The drum is immersed to a predetermined depth in the material to be filtered, which may be contained in a conventional tank or the like.

The deck D includes a cylindrical wrapper or deck plate 11 which may be formed of one piece or sections welded together or constructed in any other suitable manner. As in Fig. 2, end discs E include an annular plate 12 reinforced by radial ribs 13 of angle iron or the like welded to the plate 12, and deck D is supported by longitudinal beams 14, in turn supported from annular plate 12 through the ribs 13 to which the beams 14 are fixed, suitable reinforcing being provided as described later. A plurality of circumferentially spaced connections 15, as in Fig. 2, are attached to deck plate 11 at correspondingly spaced holes, the connections 15 being preferably disposed at the center of each deck section, although more than one connection for each section may be utilized if desired. The connections 15 may be formed from the deck plate, but are preferably separate parts welded in holes punched or drilled in the deck plate. Leading to each connection 15 is a pipe 16 for transmission of pressure and vacuum effects and the like to the respective filter sections. Suitable valve means, conventional in structure or constructed as shown in co-pending application of C. Lynn Peterson, Serial No. 519,850, filed January 27, 1944, entitled "Filtering Control Means," now Patent No. 2,555,367, June 5, 1951, is also provided for controlling the supply of vacuum and pressure effects to the pipes 16. A scraper for removing the deposited cake may also be provided on the back side of the drum. The tank, bearings, scraper, drive connection, valve for controlling pressure and vacuum effects, and pipes or the like leading to the valve, are not illustrated herein because they are conventional and form no part of the present invention.

As in Figs. 3 to 5, inclusive, the deck D may include a plurality of studs 17 which extend radially from the deck plate 11 and may be attached to the latter in a suitable manner, as by resistance welding. The ends of the studs 17 are machined or ground off in a lathe or the like, so as to be uniform in radial height, the radial height being taken from the center of rotation of the drum, and not from the deck plate. The machining operations are considerably simplified since it is necessary to remove very little material from the studs, and the deck plate 11 does not need to be machined, or formed to exact measurements. This is an important feature of this invention, since the machined studs 17 provide an accurate base for the panels P, at a minimum of machining cost.

For securing the panels to the deck, the deck D is divided into sections corresponding to panels P by fixed channels 18, extending longitudinally of the deck plate 11 and each providing an overhanging lip 19. The channels 18 are preferably welded to the deck plate 11, as shown, or may be attached thereto in any other suitable manner. A row of locking lugs 20 is also welded to the deck plate 11 adjacent each fixed channel 18, with the open end of each locking lug facing the back side of the adjacent channel 18, as in Fig. 5. Each locking lug provides an overhanging end 21, preferably tapered on the underside for a purpose described hereinafter. As will be evident, the particular shape of fixed channels 18 and locking lugs 20 as shown is not obligatory, as any other suitably shaped members providing the equivalent of overhanging lips 19 and overhanging ends 21 may be utilized.

Each panel P may comprise a perforated plate 23, which, as in Figs. 4 and 5, rests upon the machined ends of studs 17, so that uniformity of peripheral contour is assured. Each panel P also includes a wire screen 24 or the like which supports a filter cloth 25 and which is attached to the outside of each plate 23, as by welding. The edges of the screen may be maintained in position by a band 26 clamped around the ends of the wires, as shown more clearly in Fig. 7, the band 26 also preferably being welded to plate 23, as by spot welding or a plurality of spaced fusion wells. The panels are completed by a channel 27 welded to one longitudinal edge of plate 23, the thickness of the upper flange 28 of a channel 27 preferably being equal to that of the screen 24, so that a uniform upper surface, upon which filter cloth 25 rests, is assured. As shown in Fig. 5, the lower flange 29 of each channel 27 is adapted to slide beneath and to be wedged under the overhanging ends 21 of locking lugs 20. At the same time, the opposite longitudinal edge of plate 23 is adapted to be slid under the overhanging lip or flange 19 of the opposite fixed channel 18, to hold the panel in position upon the machined ends of studs 17. The space between locking lugs 20 and the back side of the adjacent fixed channel 18 is preferably sufficient to permit the insertion of lower flange 29 of channel 26 between the fixed channel 18 and the adjacent locking lugs. The panels may be locked in position by placing a bar 30 on deck 11 adjacent either channel 18 or 27, and driving compressible caulking material 31, such as lead wool, into the space between bar 30 and the opposite channel.

After the panels have been locked in position in the above manner, a filter cloth 25 is stretched over the screen, and the longitudinal edges of the filter cloth placed in the groove formed between a pair of channels 18 and 27, as in Fig. 5. The back side of each channel 18 and 27 is preferably slanted or inclined so as to form a groove between each pair of channels which is wedge-shaped, being wider at the bottom. After the filter cloths have been placed in position, these grooves are filled with compressible caulking material 32, such as lead wool or the like, and the caulking material driven into the groove to retain the filter cloths in position. To conserve caulking material and also to provide a more effective wedging action, a bar 33 may be driven into the caulking material, as from the dotted to the full position of Fig. 5. Bar 33 is preferably made of wood, although a metal bar may be used in certain installations, if desired. Lead wool or similar material as caulking, and a wooden wedging bar, will not produce sparks when struck by a hammer, and provides an important advantage when the filter is used in locations in which combustible gases may be present. In many present installations, it is necessary to remove the entire filter drum to a position outside the building, for repair or replacement of filter cloth, but with the present construction, the filter sections, and also the filter cloth, may be removed and replaced without removing the drum from its bearings. At the same time, each replaced grid section will provide a true drum diameter, because the surface is accurately spaced by studs 17. There is no danger of sparks from welding or the like, since no welding is involved in replacing either a filter section or filter cloth.

As in Fig. 6, the end discs E may be machined about their peripheries to provide a lateral flange 35, on which deck plate 11 rests, the deck plate being attached thereto in a suitable manner, as by a weld 36. However, it is preferable to provide an end ring 37, on which the machining operations are performed, and which is attached to annular plate 12 in a suitable manner, as by a weld 38. Thus, each end ring 37 may be machined to provide an inwardly tapered lip 39, which cooperates with the slanting rear of an end panel channel 27', bent to correspond to the cylindrical shape of the drum but otherwise similar to side panel channels 27, and attached to the end of perforated plate 23 in the same manner, as by welding. The circumferential groove thus formed between lip 39 and channel 27' is wedge-shaped, being wider at the bottom for reception of a bar 30' and caulking material 31', adapted to lock the panel in position, and caulking material 32', adapted to hold the ends of the filter cloth 25 securely in position. If desired, a wedging bar similar to bar 33 of Fig. 5 may be utilized around the ends of the panel, although the same will usually be found to be unnecessary. In addition, a series of winding wires 34 may be placed around the assembled sections, to prevent undue distortion of the filter cloth on blow-off.

As will be evident, the panels are readily mounted on the drum, but need not be removed for replacement of a worn or damaged filter cloth. The cloth 25 is adequately supported by screen 24, which is in turn supported in fixed position by perforated plate 23, and a uniform peripheral contour is assured through the machined ends of studs 17. The liquid to be removed by a vacuum effect transmitted to the respective filter sections through pipes 16 of Fig. 2 causes the water or other liquid to be easily removed, the liquid readily passing through filter cloth 25 and also through the screen 24 and the perforations in plate 23. The extending studs 17 occupy relatively little space, and a relatively large space between the deck plate and the perforated plate 23, for quick removal of liquid, is thereby provided. Also, such space permits a relatively quick and ready transmission of pressure effects, when the same are utilized.

Additional details of deck D and end discs E, as well as a suitable manner of installing the deck which is built up of plates 11, are illustrated in Figs. 8 to 10, inclusive. As in Fig. 8, and as indicated previously, deck D is supported by a plurality of longitudinal beams 14. Plate 11 is mounted on a series of longitudinally spaced annular channels 41, which are mounted on beams 14, as in Figs. 8 and 10. To place the annular channels 41 and deck 11 in as nearly a circular position as possible, a jack screw 42, as in Fig. 10, may be inserted through a nut 43 welded to the flange of each beam 14 at the position of a channel 41. After jack screws 42 are adjusted, as described below, shims 44 may be placed between beam 14 and channel 41, and shims 44 may be tack welded in place to retain the same in position. Of course, the annular channels 41 are preferably formed to as nearly the ultimate circular shape as possible prior to assembly over the beams 14, and may be built of two or more sections, welded end to end. If desired, jack screws 42 may be removed after shims 44 are fixed in position.

The deck plates 11 are drawn tightly about the annular channels 41 and flanges 35 of end rings 37 by a plurality of tightening studs 45, one of which is illustrated in Fig. 9, and which are placed at positions over each channel 41 and adjacent end rings 37. Each stud 45 extends between a pair of angles 46 which are attached to plate 11 on opposite sides of longitudinal seam 47 in a suitable manner, as by welding. By tightening up on studs 45, the deck plates 11 may be pulled securely into position, and jack screws 42 may then be adjusted to provide a relatively true diameter and concentricity of deck plate 11. The longitudinal seams 47 of plates 11 may be welded, and, after the plates 11 are in final position, the tightening studs 45 removed, when angles 46 may also be removed, as by sawing or gas cutting.

In fabricating the drum, the end discs E may be constructed separately. Each trunnion 10 may be constructed of heavy plate rolled into a cylinder, welded together, and then welded to an annular plate 12 and a triangular rib 48, rib 48 also being welded to a reinforcing angle or rib 13. Angles 13 are also attached, as by welding or riveting, to plate 12. Preferably, the trunnions 10 are not machined until after the above welding and riveting operations on the end discs E are completed, and end ring 37 may also be machined at this time. Supporting beams 14 may then be attached between the end discs E, as by welding triangular gusset plates 49 to beams 14, and then welding plate 49 to ribs 13 or mounting angles 50, the latter of which may in turn be riveted to annular plates 12 and alternate gusset plates 49 may be welded to ribs 48. As in Fig. 2, there may be a rib 13 only for alternate beams 14, but the number of ribs may be varied, and the beams, channels, plates, etc., may be formed by other suitable structural shapes. Also, either trunnion may be a different size, or reinforced as desired, so as to accommodate the driving mechanism for rotating the drum, the valve structure, or the like.

Upon completion of the above operations, channels 41 may be installed, and wrapper or deck plate 11 also installed, tightened and then welded together and to end rings 37. Studs 17 may be welded to deck plate 11 by an electrical resistance flash weld, produced by a suitable "gun," and locking lugs 20 welded thereto in a similar manner. Fixed channels 18 are also welded to deck plate 11 in a suitable manner, as by tack welding, resistance welding, or the like. Studs 17 are then machined, or preferably ground, to a uniform height from the center or to provide a relatively uniform radial extension, so that the panels P will be uniform circumferentially. Connections 15, pipes 16, and other elements of the filter may also be installed, access to the interior of the drum being given through trunnions 10, or through a man-hole or similar access opening, in deck D.

In the embodiment illustrated in Figs. 11 and 12, a deck D' is formed by wooden sections or staves 52, extending longitudinally of the drum and provided with longitudinal grooves in which splines 53 are dovetailed, the staves and splines being vacuum tight through swelling, being soaked in water before operation. The deck D' may be supported in a suitable manner, such as by a framework similar to that shown in Fig. 8. It is normally unnecessary to machine the outer surface of a wooden deck, as the staves may be made sufficiently accurately prior to assembly. Longitudinal fixed channels 18' and spaced locking lugs 20', as in the first embodiment, are attached to the deck, preferably by screws 54 and 55 respectively. Also, suitable connections, similar to connections 15 and pipes 16 of Fig. 2, are provided for transmitting pressure and vacuum effects to and from the sections or spaces between the fixed channels 18'.

The panels P' of this embodiment are similar to the panels P of the first embodiment, except that studs 56 are attached to the underside of plate 23, rather than being attached to the deck. As will be evident, the spacing of plates 23 from the surface of deck D' by studs 56 provides a relatively large space for the ready and quick removal of liquid during the filtering operation. The studs 56 are conveniently welded to the plate 23, as by electrical resistance welding and also are conveniently formed by rivets, with the heads 57 thereof adapted to rest upon the deck D'. While rivets are usually formed sufficiently accurately to be utilized as studs for the panels P', it will be understood that other types of studs may be used, if desired. Each panel P' includes, in addition to plate 23, a screen 24 and a panel channel 27, one end of plate 23 being adapted to be inserted under overhanging lip 19 of a fixed channel 18', and the lower flange 29 of a panel channel 27 being adapted to fit under the overhanging ends 21' of locking lugs 20', similar to the first embodiment. The plate 23, screen 24, and panel channel 27 of each panel P are welded or otherwise attached together in a manner similar to that of the first embodiment.

As illustrated in Fig. 11, caulking material 32', such as rope caulking, may be driven into the wedge-like slot formed between the fixed channels 18' and panel channels 27, and the caulking material may be retained in position by a wedge bar 33', after filtering cloths 25 have been placed in position. If desired, a binding wire 58 may be installed around the drum at intervals of six inches or so, in order to reduce the outward blow of the cloth, and also to reduce the wear on the cloth by the scraper. However, the binding wire 58 may be omitted when the nature of the material being treated warrants the same.

From the foregoing, it will be apparent that the filters and filter panels of this invention fulfill to a marked degree the requirements hereinbefore set forth. The adequate passage of liquid, the ready replacement of a grid and filter cloth or panel, and the uniformity of peripheral contour, each assured in an inexpensive manner, are all features of outstanding value. In addition, the caulking operations are relatively simple, and when a non-sparking caulking material is used, operations in situations where combustible gases may be present, are simplified to a marked degree.

It will be evident that the principles of this invention may be applied to various types of filters, and particularly to filters which may differ in valve construction, tank construction, and the like. Also, though specific embodiments of this invention have been illustrated and described in detail, it will be understood that other embodiments may exist and that various changes may be made, all without departing from the spirit and scope of this invention.

What is claimed is:

1. In a filter, a supporting deck divided into sections by longitudinally extending lip members attached thereto; fastening lug hooks attached to said deck adjacent said lip members and facing in the same direction; a filter medium support for each deck section and including a perforated plate, one edge of which is adapted to fit under the lip of said lip member and provided at its opposite edge with a longitudinally extending lip member adapted to engage the corresponding hooks when the plate is moved in one direction; a filter medium carried by each said support section; and wedging means for retaining said filter mediums in position and preventing movement of the support sections in the opposite direction.

2. A filter comprising a drum having end walls and a cylindrical supporting deck extending between said end walls; spaced overhanging lip members extending longitudinally of said drum and attached to said deck, thereby dividing said deck into circular segmental sections; a plurality of radially extending studs attached to said deck at spaced intervals in each of said sections, said studs being adapted to be machined to provide a relatively uniform radial extension thereof; a plurality of overhanging lug hooks attached to said deck and in longitudinal alignment adjacent each said lip member, the opening of each lug hook being toward the adjacent lip member; a filter medium panel for each section and including a perforated supporting plate adapted along one edge to fit beneath the overhanging lip of said member; an angular bar for each panel attached to the opposite edge of said plate and providing a lower lip adapted to be slid under said lug hooks as the opposite side of said plate is slid under the lip of said lip member, said lip members and panel bars having sloping sides adapted to provide between adjacent members and bars longitudinally extending, wedge-shaped grooves wider at the bottom; an end bar attached to the end of each said panel plate, said end bars and said drum ends being constructed to provide wedge-shaped grooves wider at the bottom along each end of each panel; a wire-like screen attached to the outside of each perforated plate; a cloth-like filter medium extending over each screen and into the grooves at each side and the end of each panel; compressible material wedged in said grooves for retaining each filter medium and panel in attached position; and conduit means connected with each deck plate section for transmitting pressure and vacuum effects to each filtering section.

3. A filter comprising a drum having end walls and a cylindrical supporting deck extending between said end walls; spaced overhanging lip members extending longitudinally of said drum and attached to said deck, thereby dividing said deck into circular segmental sections; a plurality of radially extending projections attached to said deck at spaced intervals in each of said sections, said projections being adapted to be machined to provide a relatively uniform radial extension thereof; a plurality of overhanging lug hooks attached to said deck and in longitudinal alignment adjacent each said lip member, the opening of each lug hook being toward the adjacent lip member; a filter medium panel for each section and including a perforated supporting plate adapted along one edge to fit beneath the lip of the lip member; an angular bar for each panel attached to the opposite edge of said plate and having a lower lip adapted to be slid under said lug hooks as the opposite side of said plate is slide under the lip of said lip member, said lip members and panel bars having inwardly sloping sides adapted to provide a longitudinally extending, wedge-shaped slot wider at the bottom, between a lip member and the adjacent panel bar; an end bar attached to the end of each said panel plate, said end bars and said drum ends being constructed to provide wedge-shaped grooves wider at the bottom along each end of each panel; a wire-like screen attached to the outside of each perforated plate; a cloth-like filter medium extending over each screen and into the grooves at each side and the end of each panel; retaining strips extending along said panel sides and ends in the bottom of said grooves; compressible material wedged in said grooves for retaining said strips and filter medium in attached position; and conduit means connected with each deck plate section for transmitting pressure and vacuum effects to each filtering section.

4. A filter comprising a drum having end walls and a cylindrical supporting deck extending between said end walls; spaced overhanging lip members extending longitudinally of said drum and attached to said deck, thereby dividing said deck into circular segmental sections; a plurality of radially extending studs attached to said deck at spaced intervals in each of said sections, said studs being adapted to be machined to provide a relatively uniform radial extension thereof; a plurality of lug hooks attached to said deck and in longitudinal alignment adjacent each said lip member, the opening of each lug hook being toward the adjacent lip member; a filter medium panel for each section and including a perforated supporting plate adapted along one edge to fit beneath the overhanging lip of said member; an angular bar for each panel attached to the opposite edge of said plate and having a lower lip adapted to be slid under said lug hocks as the opposite side of said plate is slid under the lip of said lip member, said lip members and panel bars having sloping sides adapted to provide between adjacent members and bars longitudinally extending, wedge-shaped grooves wider at the bottom; an end bar attached to the end of each said panel plate, said end bars and said drum ends being constructed to provide wedge-shaped grooves wider at the bottom along each end of each panel; a wire-like screen attached to the outside of each perforated plate; a cloth-like filter medium extending over each screen and into the grooves at each side and the end of each panel; compressible material wedged in said grooves for retaining said filter medium and panels in attached position; longitudinal wedging bars displacing compressible material in each of said longitudinal grooves; and conduit means connected with each deck plate section for transmitting pressure and vacuum effects to each filtering section.

5. A filter comprising a drum having end walls and a cylindrical metal supporting deck extending between said end walls; spaced channels providing overhanging lips and extending longitudinally of said drum and welded to said deck, thereby dividing said deck into circular segmental sections; a plurality of radially extending studs welded to said deck at spaced intervals in each of said sections, said studs being machined to provide uniform radial extension thereof; a plurality of lug hooks welded to said deck and in longitudinal alignment adjacent each said channel, the opening of each lug hook being toward the adjacent channel; a filter medium panel for each section and including a perforated supporting plate adapted along one edge to fit beneath the overhanging lip of a channel; a side channel for each panel attached to the opposite edge of said plate and having a lower lip adapted to be slid under said lug hooks as the opposite side of said plate is slid under the lip of said channel, said deck channels and panel channels having inwardly sloping sides adapted to provide a longitudinally extending, wedge-shaped slot wider at the bottom, between a deck channel and the adjacent panel channel; a channel welded to the end of each said panel plate, said end channels and said drum ends being constructed to provide wedge-shaped grooves wider at the bottom along each end of each panel; a wire-like screen welded to the outside of each perforated plate; a cloth-like filter medium extending over each screen and into the grooves at each side and the end of each panel; compressible material wedged in said grooves for retaining said filter medium in attached position; and conduit means connected with each deck plate section for transmitting pressure and vacuum effects to each filtering section.

6. A filter comprising a drum having a deck divided into longitudinal segments, a longitudinally extending overhanging lip member secured to the deck near a boundary of each section, a plurality of lug hooks secured to the deck in each section near the opposite boundary thereof, said hooks and lip members facing in the same direction, a substantially rigid filter medium support for each section having an edge adapted to fit beneath the overhanging lip member, radially extending supporting studs disposed between the support and the deck, an angular member depending from each support and having a lower lip adapted to be slid under the lug hooks as the opposite side of said support is slid under the overhanging lip member, and means for locking the support against movement in a direction disengaging the support from the lug hooks and overhanging lip member.

7. In a filter a supporting deck divided into sections, a filter medium panel for each deck section, a depending channel on an edge of each panel having a lower flange extending towards the opposite edge of the panel, and longitudinally extending fastening means near the longitudinal boundaries of each section for attaching said filter medium panel to said deck, said fastening means including a member attached to the deck and providing an overhanging lip beneath which said opposite edge of the panel may be inserted and spaced cooperating members also fixed to the deck near the other extremity of the section disposed to engage the lower flange on the channel, all of said fastening means facing in the same direction and being adapted to lock the panel to the deck as the panel is slid in one direction.

8. In a filter a supporting deck divided into sections, a filter medium panel for each section, each panel having a first edge including a depending angular member having a lower lip generally parallel to the panel, studs for supporting the panels above the deck, a first longitudinal fastening member fixed to the deck along an edge of each section and having a lateral upper lip for engagement with the second edge of the panel, hooks fixed to the deck along the opposite edge of each section having lips extending in the same direction as the lips of the first fastening member for sliding engagement with the lip of the angular member on the panel when the panel is slid in a direction engaging the second edge of the panel with the first fastening member, and a bar for forcing the first edge of the panel away from the first fastening member of the adjacent section, whereby unlocking movement of the panel is prevented.

C. LYNN PETERSON.
EUGENE KROFF.
CLARENCE J. PETERSON.

REFERENCES CITED

The following references are of record in the file of this patent:

UNITED STATES PATENTS

| Number | Name | Date |
|---|---|---|
| 1,892,306 | Hillier | Dec. 27, 1932 |
| 2,134,703 | Cobb | Nov. 1, 1938 |
| 2,212,168 | Peterson | Aug. 20, 1940 |
| 2,259,235 | Weiss | Oct. 14, 1941 |
| 2,289,411 | Denhard et al. | July 14, 1942 |
| 2,389,622 | Hensel | Nov. 27, 1945 |
| 2,416,499 | Saxe | Feb. 25, 1947 |
| 2,472,558 | Ackerly | June 7, 1949 |